US012693456B2

(12) United States Patent
Kim et al.

(10) Patent No.: US 12,693,456 B2
(45) Date of Patent: Jul. 28, 2026

(54) WINDOW, DISPLAY DEVICE INCLUDING THE WINDOW, AND MANUFACTURING METHOD THEREOF

(71) Applicant: Samsung Display Co., LTD., Yongin-si (KR)

(72) Inventors: Tecksoo Kim, Yongin-si (KR); Dong-Cheon Shin, Yongin-si (KR); Junga Lee, Yongin-si (KR); Bang-Geul Choi, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 317 days.

(21) Appl. No.: 18/233,951

(22) Filed: Aug. 15, 2023

(65) Prior Publication Data

US 2024/0118460 A1 Apr. 11, 2024

(30) Foreign Application Priority Data

Oct. 11, 2022 (KR) ........................ 10-2022-0130025

(51) Int. Cl.
*G02B 5/00* (2006.01)
*G02F 1/1333* (2006.01)
*G06F 1/16* (2006.01)
*G09F 9/30* (2006.01)

(52) U.S. Cl.
CPC ....... *G02B 5/003* (2013.01); *G02F 1/133308* (2013.01); *G02F 1/133331* (2021.01); *G09F 9/301* (2013.01); *G06F 1/1656* (2013.01)

(58) Field of Classification Search
CPC .......... H10K 59/8722; G02F 1/133308; G02F 2202/28; G02F 1/1339; G02F 1/133331; G02F 1/1341; G02B 5/003
See application file for complete search history.

(56) References Cited

U.S. PATENT DOCUMENTS

| | | | |
|---|---|---|---|
| 2009/0190071 A1* | 7/2009 | Kubota | G02F 1/133512 349/110 |
| 2015/0177790 A1* | 6/2015 | Uto | G06F 1/1605 361/679.26 |
| 2016/0016845 A1 | 1/2016 | Cho et al. | |
| 2020/0285097 A1* | 9/2020 | Zhang | H04M 1/0266 |
| 2021/0096424 A1* | 4/2021 | Hsu | G02F 1/133311 |

FOREIGN PATENT DOCUMENTS

| | | |
|---|---|---|
| CN | 211207839 U | 8/2020 |
| CN | 110099149 B | 5/2021 |
| KR | 101707429 B1 | 2/2017 |
| KR | 20210053542 A | 5/2021 |

OTHER PUBLICATIONS

US 9,001,996 B1, 04/2015, Uto et al. (withdrawn)

* cited by examiner

*Primary Examiner* — Alexander P Gross
(74) *Attorney, Agent, or Firm* — CANTOR COLBURN LLP

(57) ABSTRACT

A window includes a window base with a groove having a recessed shape on an upper surface thereof, and a first blocking ink layer and a second blocking ink layer each disposed in the groove, where the first blocking ink layer and the second blocking ink layer are disposed in a same layer as each other, and the first blocking ink layer surrounds the second blocking ink layer in a plan view.

34 Claims, 16 Drawing Sheets

(d)

(c)

(b)

PA (a)

RS

WINDOW, DISPLAY DEVICE INCLUDING THE WINDOW, AND MANUFACTURING METHOD THEREOF

This application claims priority to Korean Patent Application No. 10-2022-0130025, filed on Oct. 11, 2022, and all the benefits accruing therefrom under 35 U.S.C. § 119, the content of which in its entirety is herein incorporated by reference.

BACKGROUND

1. Field

The disclosure herein relates to a window, a display device including the window, and a manufacturing method thereof, and more particularly, to a window including an ink layer, a display device including the window, and a manufacturing method thereof.

2. Description of the Related Art

A display device displays various images on a display screen to provide information to a user. Specifically, the display device provides images generated in a display panel to the user via a window. The window may include a portion transmitting images and a portion not transmitting images that prevent internal components of the display device from being visually recognized by the user.

SUMMARY

In a window of a display device including a portion transmitting images and a portion not transmitting images, the portion not transmitting images may include an ink layer pattern. The ink layer pattern formed in the window is desired to have sufficient coupling strength with components of the display device, and to have aesthetics.

The disclosure provides a window with improved reliability and a display device with improved display quality.

The disclosure also provides a method for manufacturing a display device, the method with an improved manufacturing yield.

An embodiment of the invention provides a window including a window base with a groove having a recessed shape on an upper surface thereof, and a first blocking ink layer and a second blocking ink layer each disposed in the groove, where the first blocking ink layer and the second blocking ink layer are disposed in a same layer as each other, and the first blocking ink layer surrounds the second blocking ink layer in a plan view.

In an embodiment, at least one selected from the first blocking ink layer and the second blocking ink layer may include a matting agent, where a content of the matting agent of the first blocking ink layer may be greater than a content of the matting agent of the second blocking ink layer.

In an embodiment, the window may further include a background ink layer disposed in the groove, where the first blocking ink layer and the second blocking ink layer may be disposed on the background ink layer.

In an embodiment, in the plan view, a portion of the background ink layer may overlap the first background ink layer, and the remaining portion of the background ink layer may overlap the second blocking ink layer.

In an embodiment, the surface roughness of the first blocking ink layer may be different from the surface roughness of the second blocking ink layer.

In an embodiment, the surface roughness of the first blocking ink layer may be higher than the surface roughness of the second blocking ink layer.

In an embodiment, the upper surface of the window base, an upper surface of the first blocking ink layer, and an upper surface of the second blocking ink layer may be on a same plane.

In an embodiment, the groove may be defined along an edge of the window base.

In an embodiment, the window may further include a background ink layer disposed in the groove, wherein the groove may include a bottom surface and a side surface connected between the bottom surface and the upper surface, where the bottom surface may be in contact with the background ink layer, and the side surface may be in contact with the background ink layer and with the second blocking ink layer.

In an embodiment, each of the first blocking ink layer and the second blocking ink layer may include a light blocking material, and the first blocking ink layer may further include a matting agent including $SiO_2$.

In an embodiment, the first blocking ink layer may include the matting agent in an amount of greater than about 10 weight percent (wt %).

In an embodiment, the first blocking ink layer may include the matting agent in an amount of about 12 wt % to about 14 wt %.

In an embodiment, the second blocking ink layer may further include a matting agent, wherein the second blocking ink layer may include the matting agent in an amount of about 5 wt % or less.

In an embodiment, the second blocking ink layer may not include the matting agent.

In an embodiment, the matting agent may include $SiO_2$.

In an embodiment, the window base may have light transmittance.

In an embodiment, the surface energy of the first blocking ink layer may be about 38 dynes per centimeter (dyne/cm) or greater.

In an embodiment, the surface energy of the second blocking ink layer may be about 30 dyne/cm or less.

In an embodiment of the invention, a display device includes a window, a display module disposed on an upper surface of the window, and a set module disposed on the display module, where the window includes a window base with a groove having a recessed shape on the upper surface, a first blocking ink layer disposed in the groove, and a second blocking ink layer disposed in the groove and disposed in a same layer as the layer on which the first blocking ink layer is disposed. In such an embodiment, the display module is disposed on an upper surface of the window base and on the second blocking ink layer in a plan view, and on a plane, the set module is disposed on the first blocking ink layer in the plan view.

In an embodiment, the window may further include a background ink layer disposed in the groove, wherein the first blocking ink layer and the second blocking ink layer may be disposed on the background ink layer.

In an embodiment, the surface roughness of the first blocking ink layer may be different from the surface roughness of the second blocking ink layer.

In an embodiment, the surface roughness of the first blocking ink layer may be higher than the surface roughness of the second blocking ink layer.

3

In an embodiment, the upper surface of the window base, an upper surface of the first blocking ink layer, and an upper surface of the second blocking ink layer may be on a same plane.

In an embodiment, the window may include a transmissive region in which light is transmitted and a bezel region in which the light is blocked, wherein the groove may be disposed in the bezel region.

In an embodiment, in the plan view, the second blocking ink layer may surround the transmissive region, and the first blocking ink layer may surround the second blocking ink layer.

In an embodiment, the display module may include an active region and a peripheral region adjacent to the active region, wherein the active region may be disposed on the transmissive region, and the peripheral region may be disposed on the second blocking ink layer.

In an embodiment, the set module may cover the display module and may be disposed on the first blocking ink layer.

In an embodiment, the first blocking ink layer may include a matting agent including $SiO_2$, and the second blocking ink layer may not include the matting agent.

In an embodiment of the invention, a method for manufacturing a display device includes providing a window base including an upper surface and having light transmittance, forming a groove having a recessed shape on the upper surface of the window base, forming a first blocking ink layer on a portion of the groove, and forming a second blocking ink layer on the remaining portion of the groove.

In an embodiment, the method further include providing a background ink layer in the groove, where the first blocking ink layer may be formed on a portion of the background ink layer, and the second blocking ink layer may be formed on the remaining portion of the background ink layer.

In an embodiment, the surface roughness of the first blocking ink layer may be different from the surface roughness of the second blocking ink layer.

In an embodiment, the method may further include providing a display module on the window base, where the display module may be attached to the upper surface of the window base and to the second blocking ink layer.

In an embodiment, the method may further include providing a set module on the display module, wherein the set module may be attached to the display module and to the first blocking ink layer.

In an embodiment, the forming the first blocking ink layer may be including providing a first blocking ink material on the portion of the groove and drying the first blocking ink material, and the forming the second blocking ink layer may include providing a second blocking ink material on the remaining portion of the groove and drying the second blocking ink material, where the drying time of the first blocking ink material may be longer than the drying time of the second blocking ink material.

In an embodiment, the first blocking ink material may include a matting agent include $SiO_2$.

In an embodiment, the first blocking ink material may include the matting agent in an amount of greater than about 10 wt %.

In an embodiment, the first blocking ink material may include the matting agent in an amount of about 12 wt % to about 14 wt %.

In an embodiment, the second blocking ink material may include a matting agent including $SiO_2$, where the second blocking ink material may include the matting agent in an amount of about 5 wt % or less.

In an embodiment, the surface roughness of the first blocking ink layer may be higher than the surface roughness of the second blocking ink layer.

In an embodiment, the upper surface of the window base, the first blocking ink layer, and the second blocking ink layer may be on a same plane.

BRIEF DESCRIPTION OF THE DRAWINGS

The accompanying drawings are included to provide a further understanding of embodiments of the invention, and are incorporated in and constitute a part of this specification. The drawings illustrate various embodiments of the invention and, together with the description, serve to explain principles of the invention. In the drawings.

DETAILED DESCRIPTION

Figure 1:
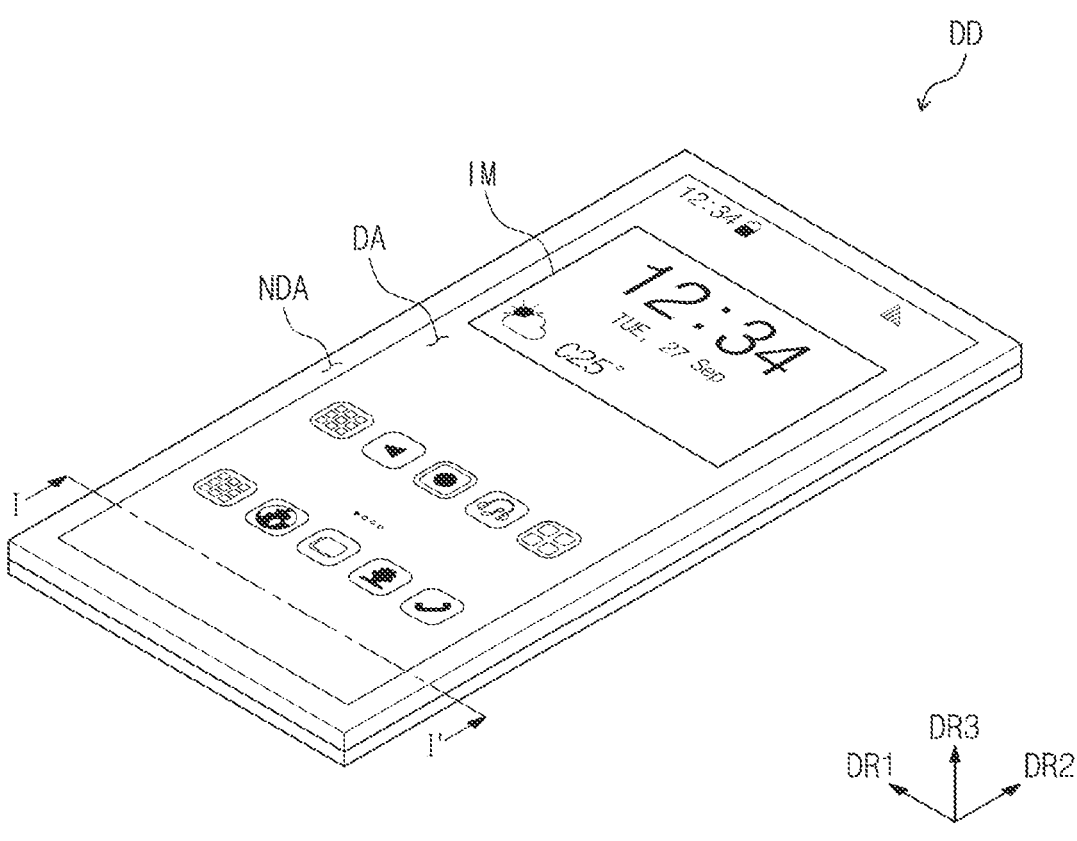
FIG. 1 is a combined perspective view of a display device of an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In the disclosure, when an element (or a region, a layer, a portion, etc.) is referred to as being "on," "connected to," or "coupled to" another element, it means that the element may be directly disposed on/connected to/coupled to the other element, or that a third element may be disposed therebetween.

Like reference numerals refer to like elements. Also, in the drawings, the thickness, the ratio, and the dimensions of elements are exaggerated for an effective description of technical contents.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of which associated elements may define.

It will be understood that, although the terms "first," "second," etc. may be used herein to describe various elements, these elements should not be limited by these terms. These terms are only used to distinguish one element from another. For example, a first element may be referred to as a second element, and a second element may also be referred to as a first element in a similar manner without departing the scope of rights of the invention. The terms of a singular form may include plural forms unless the context clearly indicates otherwise.

In addition, terms such as "below," "lower," "above," "upper," and the like are used to describe the relationship of components shown in the drawings. The terms are used as a relative concept and are described with reference to the direction indicated in the drawings.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It is also to be understood that terms defined in commonly used dictionaries should be interpreted as having meanings consistent with the meanings in the context of the related art and the disclosure, and will not be interpreted in an idealized or overly formal sense unless expressly so defined herein.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a cover window according to an embodiment of the invention, a display device including the cover window, and a manufacturing method thereof will be described in detail with reference to the accompanying drawings.

Figure 2:
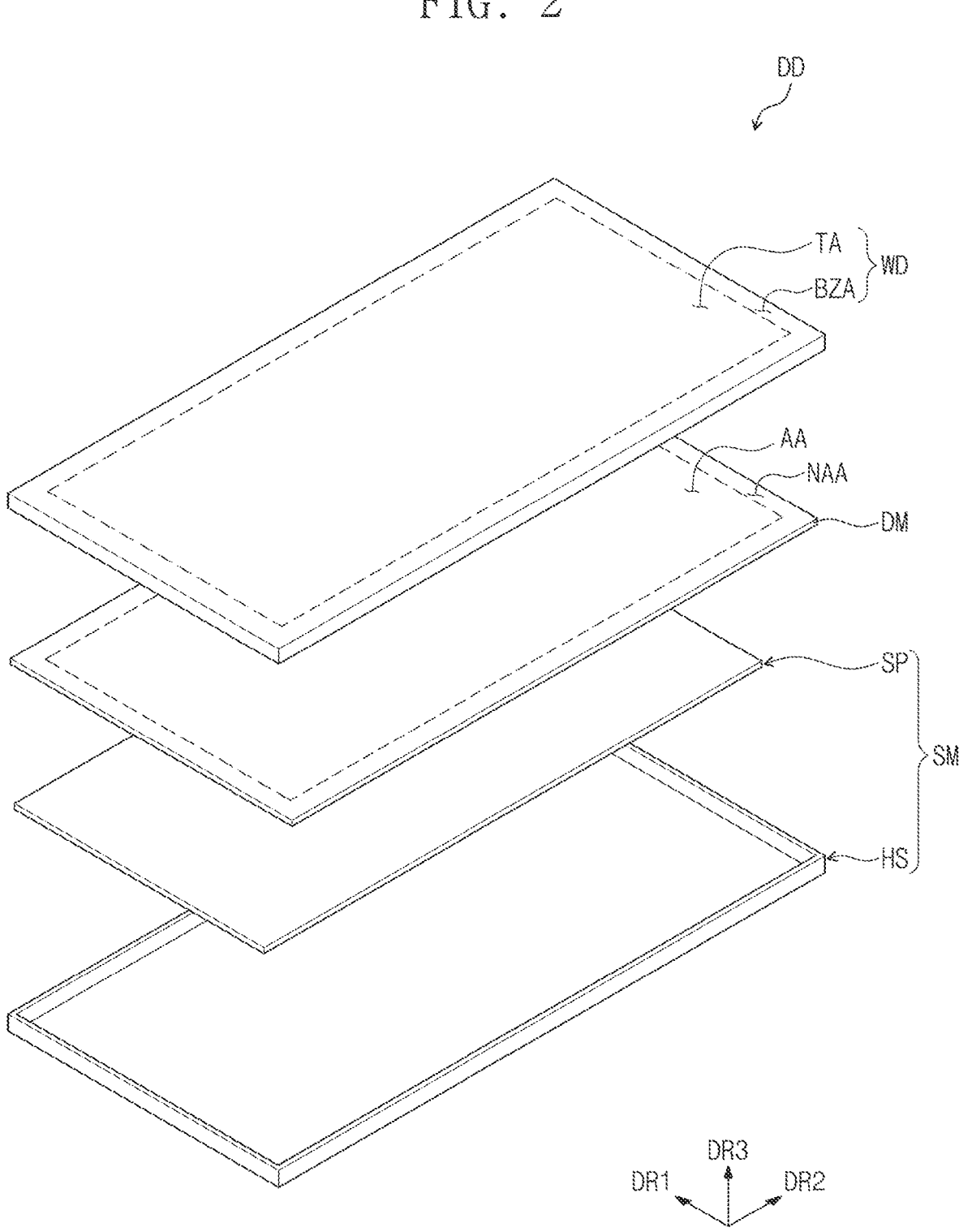
FIG. 2 is an exploded perspective view of a display device of an embodiment of the invention.
Figure 3:
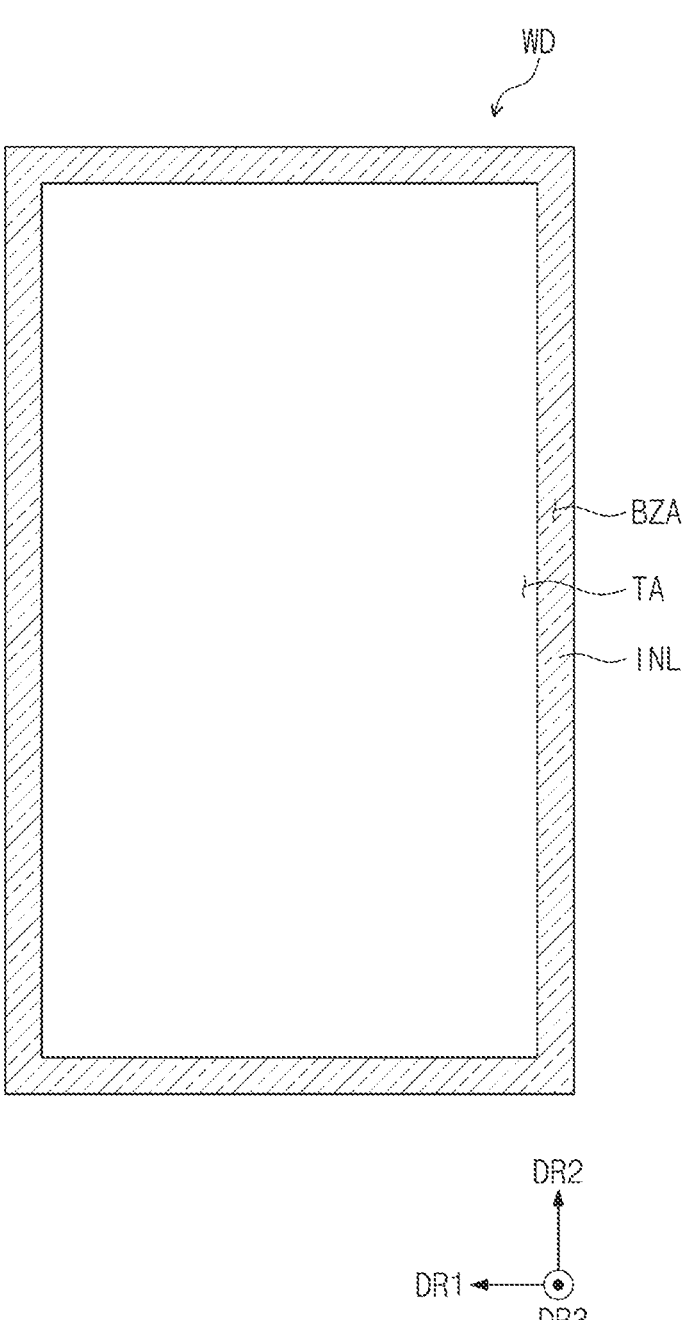
FIG. 3 is a plan view of a window of an embodiment of the invention.
Figure 4:
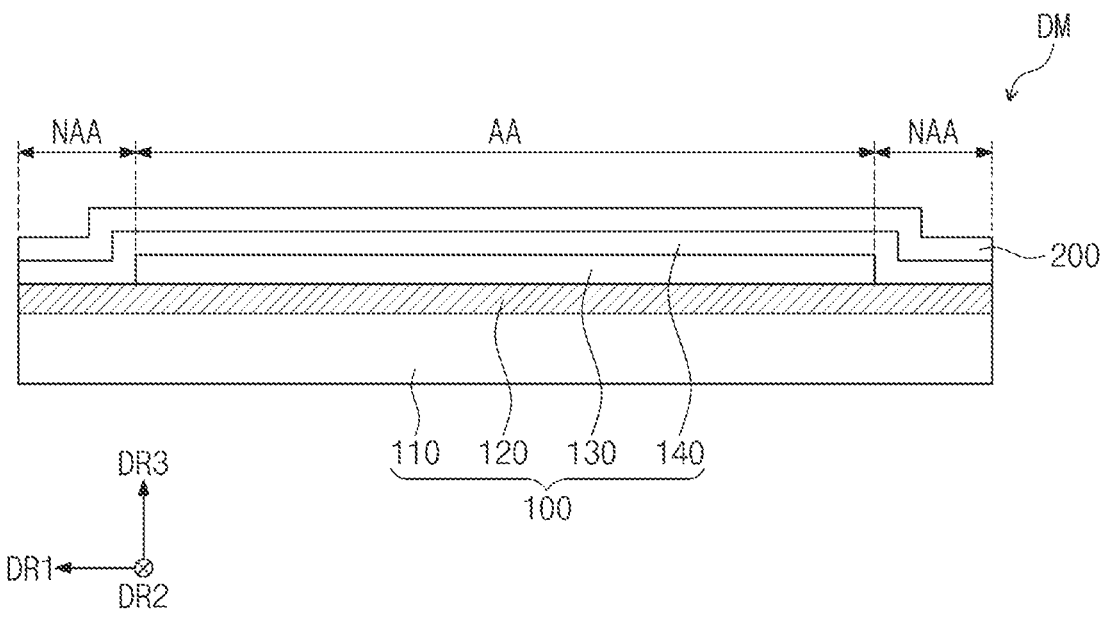
FIG. 4 is a cross-sectional view of a display module of an embodiment of the invention.

FIG. 1 and FIG. 2 are perspective views of a display device DD of an embodiment of the invention. FIG. 3 is a plane view of a window WD of an embodiment of the invention. FIG. 4 is a cross-sectional view of a display module DM of an embodiment of the invention.

FIG. 1 is a perspective view of the display device DD, and FIG. 2 is an exploded perspective view of the display device DD.

Referring to FIG. 1 and FIG. 2, an embodiment of the display device DD may be a device activated by an electrical signal. In an embodiment, for example, the display device DD may be a personal digital terminal, a tablet computer, a car navigation system unit, a game console, or a wearable device, but is not limited thereto. In FIG. 1 and FIG. 2, an embodiment where the display device DD is a portable electronic device is illustrated as an example.

The display device DD may display an image IM through a display region DA. The display region DA may include a surface (or a flat surface) on a plane defined by a first direction DR1 and a second direction DR2. However, the shape of the display region DA is not limited thereto, and for example, the display region DA may further include a curved surface bent from at least one side of the surface on the plane defined by the first direction DR1 and the second direction DR2.

A non-display region NDA is adjacent to the display region DA. The non-display region NDA may surround the display region DA. Accordingly, the shape of the display region DA may be defined substantially by the non-display region NDA. However, this is only an example, and alternatively, the non-display region NDA may be disposed adjacent to only one side of the display region DA, or may be disposed in a transmissive region TA.

In FIG. 1 and the following drawings, the first direction DR1 to a third direction DR3 are illustrated, and directions indicated by the first to third directions DR1, DR2, and DR3 described in the disclosure are a relative concept, and may be converted to different directions. In the disclosure, the first direction DR1 and the second direction DR2 are perpendicular to each other, and the third direction DR3 may be a normal direction with respect to a plane defined by the first direction DR1 and the second direction DR2.

A thickness direction of the display device DD may be a direction parallel to the third direction DR3, which is the normal direction with respect to the plane defined by the first direction DR1 and the second direction DR2. In the disclosure, a front surface (or an upper surface) and a rear surface (or a lower surface) of members constituting a display device DD may be defined with respect to the third direction DR3.

Referring to FIG. 2, an embodiment of the display device DD may include a window WD, a display module DM, and a set module SM.

The window WD may be disposed on the display module DM to cover an entire surface of the display module DM.

The window WD may have a shape corresponding to the shape of the display module DM. In an embodiment of the display device DD, the window WD may include an optically transparent insulation material. The window WD may include glass, sapphire, or a polymer. In an embodiment, for example, the window WD may include a chemically enhanced tempered glass.

The window WD may be divided into the transmissive region TA and a bezel region BZA. The transmissive region TA may a portion corresponding to the display region DA of the display device DD, and the bezel region BZA may be a portion corresponding to the non-display region NDA of the display device DD. The bezel region BZA may define the shape of the transmissive region TA. The bezel region BZA may be adjacent to the transmissive region TA, and may surround the transmissive region TA. However, the embodiment is not limited to what is illustrated, and alternatively, the bezel region BZA may be disposed adjacent to only one side of the transmissive region TA, or may be disposed in the transmissive region TA.

Referring to FIG. 3, the window WD may include an ink layer INL. The ink layer INL may surround the transmissive region TA. A region in which the ink layer INL is disposed may be defined as the bezel region BZA. The ink layer prevents components inside the display device DD from being visually recognized from the outside, and may improve aesthetics of the display device DD.

Referring to FIG. 1 to FIG. 4 together, the display module DM may be disposed in a lower portion of the window WD. The display module DM may be a component configured to generate an image and sense an input applied from the outside. In an embodiment, as shown in FIG. 4, the display module DM may include a display panel 100 and a sensor layer 200.

The display panel 100 may be a component which substantially generates an image. The display panel 100 may be a light emitting-type display panel, and for example, an organic light emitting display panel, an inorganic light emitting display panel, a micro-light emitting diode (LED) display panel, or a nano-LED display panel. The display panel 100 may also be referred to as a display layer.

The display panel 100 may include a base layer 110, a circuit layer 120, a light emitting element layer 130, and an encapsulation layer 140.

The base layer 110 may be a member which provides a base surface on which the circuit layer 120 is disposed. The base layer 110 may be a rigid substrate, or a flexible substrate capable of bending, folding, rolling, and the like. The base layer 110 may be a glass substrate, a metal substrate, a polymer substrate, or the like. However, the embodiment of the invention is not limited thereto, and the base layer 110 may be an inorganic layer, an organic layer, or a composite material layer.

The base layer 110 may have a multi-layered structure. In an embodiment, for example, the base layer 110 may include a first synthetic resin layer, a multi-layered or single-layered inorganic layer, and a second synthetic resin layer disposed above the multi-layered or single-layered inorganic layer. Each of the first and second synthetic resin layers may include a polyimide-based resin, but is not particularly limited thereto.

The circuit layer 120 may be disposed above the base layer 110. The circuit layer 120 may include an insulation layer, a semiconductor pattern, a conductive pattern, a signal line, or the like. An insulation layer, a semiconductor layer, and a conductive layer are formed above the base layer 110 by coating, deposition, or the like, and thereafter, the insulation layer, the semiconductor layer, and the conductive layer may be selectively patterned through a photolithography process and an etching process performed a plurality of times.

The light emitting element layer 130 may be disposed above the circuit layer 120. The light emitting element layer 130 may include a light emitting element. In an embodiment, for example, the light emitting element may include an organic light emitting material, an inorganic light emitting material, an organic-inorganic light emitting material, a quantum dot, a quantum rod, a micro-LED, or a nano-LED.

The encapsulation layer 140 may be disposed above the light emitting element layer 130. The encapsulation layer 140 may protect the light emitting element layer 130 from foreign substances such as moisture, oxygen, and dust particles. The encapsulation layer 140 may include at least one inorganic layer. The encapsulation layer 140 may include a laminate structure of an inorganic layer/an organic layer/an inorganic layer.

The sensor layer 200 may be disposed above the display panel 100. The sensor layer 200 may sense an external input applied from an outside. The external input may be a user input. The user input may include various forms of external inputs such as a part of a user's body, light, heat, a pen, a pressure, or the like.

In an embodiment, the sensor layer 200 may be formed above the display panel 100 through a continuous process. In such an embodiment, the sensor layer 200 may be directly disposed above the display panel 100. Here, "being directly disposed" may mean that a third constituent element is not disposed between the sensor layer 200 and the display panel 100. That is, a separate adhesive member may not be disposed between the sensor layer 200 and the display panel 100.

On the sensor layer 200, a reflection prevention layer (not shown) may be further disposed. The reflection prevention layer may reduce the reflectance of external light incident from the outside of the display device DD. The refection prevention layer may be formed above the sensor layer 200 through a continuous process. The refection prevention layer may include color filters. The color filters may have a predetermined arrangement. In an embodiment, for example, the color filters may be arranged in consideration of light emission colors of pixels included in the display panel 100. In addition, the refection prevention layer may further include a black matrix adjacent to the color filters.

In an alternative embodiment of the invention, the sensor layer 200 may be omitted.

The display module DM may further include an adhesive layer. The display module DM may be attached to the window WD by the adhesive layer. The adhesive layer may have transparency, and for example, may be an optically clear adhesive (OCA).

In the display module DM, an active region AA and a peripheral region NAA may be defined. The active region AA may be a region activated by an electrical signal. In the peripheral region NAA, a driving circuit, a driving line, or the like for driving the active region AA may be disposed.

The active region AA may correspond to the display region DA of display device DD illustrated in FIG. 1. The peripheral region NAA may correspond to the non-display region NDA of the display device DD illustrated in FIG. 1.

In an embodiment, the peripheral region NAA may be disposed surrounding the active region AA. However, the embodiment of the invention is not limited thereto. In an alternative embodiment, the peripheral region NAA may be disposed adjacent to only one side of the active region AA, or may be disposed in the active region AA.

The set module SM may include a support layer SP and a housing HS. The support layer SP may have a single-layered structure or a multi-layered structure. The support layer SP may support the display module DM and the window WD. In an embodiment, for example, the support layer SP may include at least one selected from a metal layer, a cushion layer, and a heat dissipating layer.

The housing HS receives the display module DM and the support layer SP, and may be coupled to the window WD. The housing HS may include a plurality of parts that are assembled (or combined) with each other, or be a single injection molded body. The housing HS may include glass, plastic, or a metal.

Figure 5A:
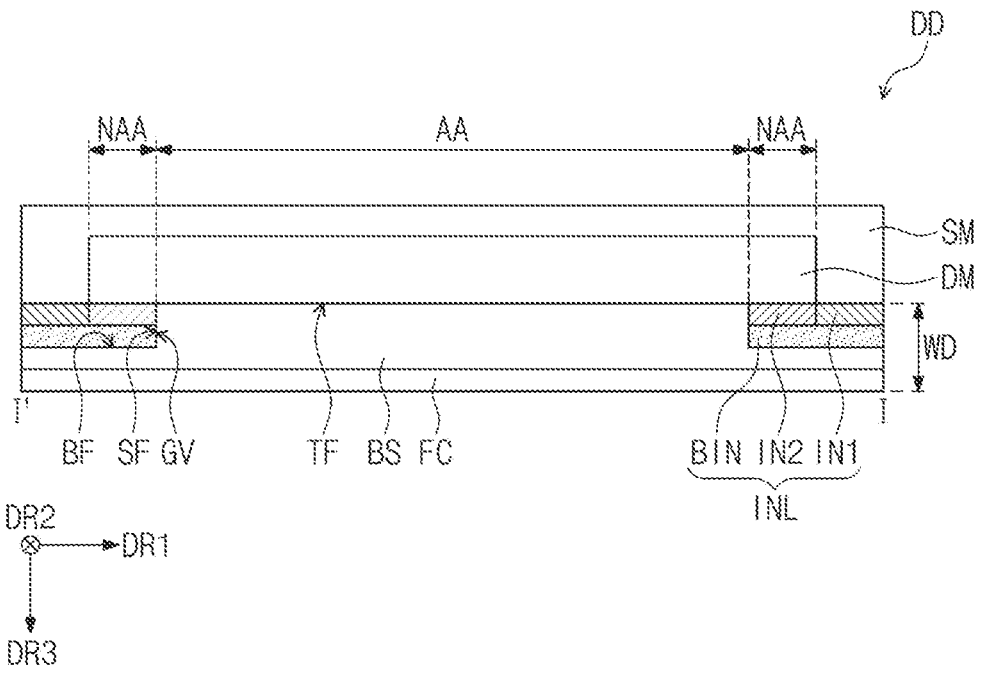
FIG. 5A is a cross-sectional view of an embodiment showing a portion taken along line I-I' of FIG. 1.
Figure 5B:
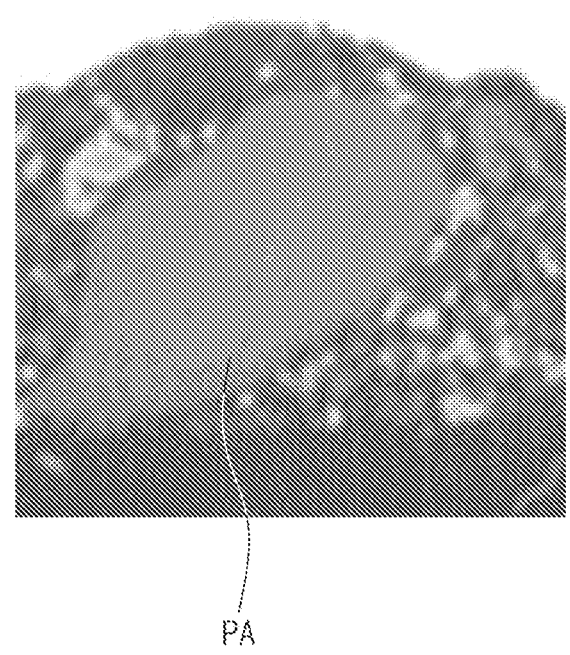
FIG. 5B is an enlarged image of a cross-section of a first blocking ink layer of an embodiment of the invention.
Figure 5C:
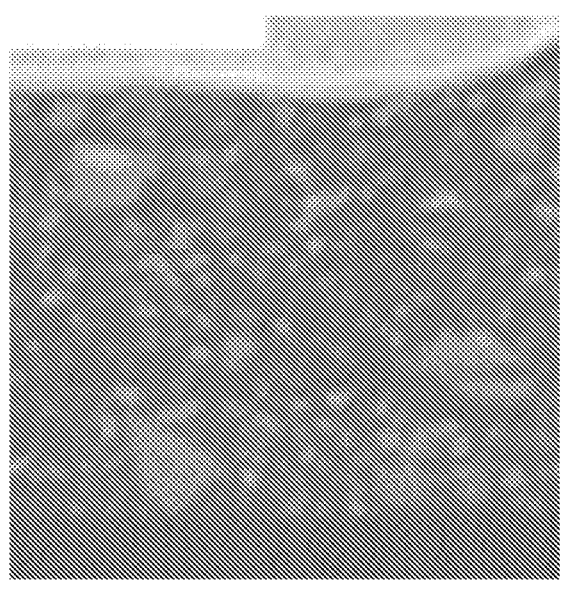
FIG. 5C is an enlarged image of a cross-section of a second blocking ink layer of an embodiment of the invention.
Figure 5D:
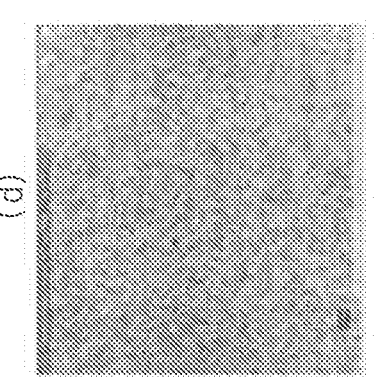
FIG. 5D is images of surfaces of ink layers according to the content of a matting agent.
Figure 5D:
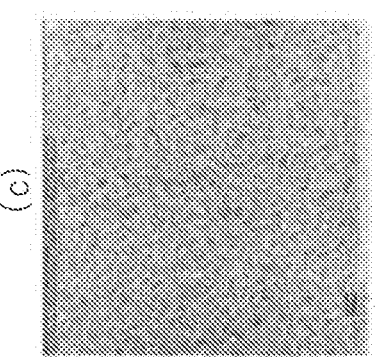
Figure 5D:
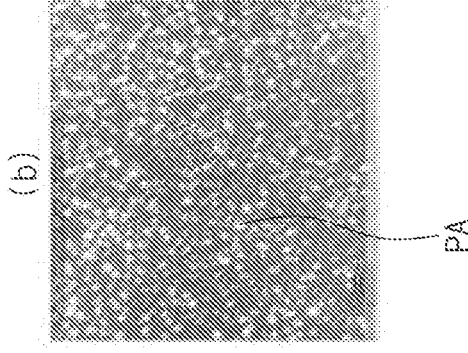
Figure 5D:
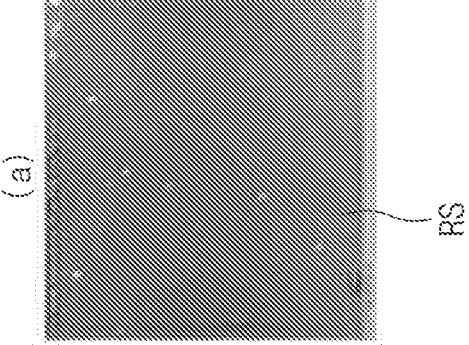

FIG. 5A is a cross-sectional view of an embodiment showing a portion taken along line I-I' of FIG. 1. FIG. 5B is an enlarged image of a cross-section of a first blocking ink layer of an embodiment of the invention. FIG. 5C is an enlarged image of a cross-section of a second blocking ink layer of an embodiment of the invention. FIG. 5D is images of surfaces of ink layers according to the content of a matting agent.

For convenience of description, FIG. 5A illustrates a cross-sectional view in which the front surface of the display device DD of FIG. 1 is facing downward, and the rear surface thereof is facing upward. That is, FIG. 5A shows the display device DD in a state where the display module DM is disposed on the window WD, and the set module SM is disposed on the display module DM. However, the concept of up/down is a relative concept and may be converted to different directions.

Referring to FIG. 5A, the window WD includes a window base BS with a groove GV and the ink layer INL.

The window base BS may be a transparent film through which light transmits. In an embodiment, for example, the window base BS may include at least one selected from a glass substrate, a sapphire substrate, and a plastic a substrate.

In the window base BS, the groove GV is defined. The groove GV may have a recessed shape on an upper surface TF of the window base BS. The groove GV may include or be defined by a window bottom surface BF and a side surface SF extending from the bottom surface BF to the upper surface TF. The bottom surface BF is illustrated as being parallel to the upper surface TF, but may be substantially parallel to the upper surface TF including process errors occurring when forming the groove GV. Alternatively, the bottom surface BF may not be parallel to the upper surface TF. The side surface SF may be connected between the bottom surface BF of the groove GV and the upper surface TF of the window base BS.

In an embodiment, the groove GV may be defined or disposed along an edge of the window base BS. However, the embodiment of the invention is not limited thereto.

In the groove GV, the ink layer INL is disposed. The groove GV may be filled with the ink layer INL. Between the ink layer INL disposed in the groove GV and the upper surface TF of the window base BS, a step may not be present, that is, the ink layer INL and the upper surface TF may be on a same plane or collectively define a substantially flat surface.

Since the ink layer INL is disposed in the groove GV, the window WD may provide a flat surface to the display module DM and to the set module SM.

The ink layer INL includes a first blocking ink layer IN1 and the second blocking ink layer IN2. That is, the first blocking ink layer IN1 and the second blocking ink layer IN2 are disposed in the groove GV. In addition, the first blocking ink layer IN1 and the second blocking ink layer IN2 may be disposed in a same layer as each other.

The ink layer INL may further include a background ink layer BIN. The first blocking ink layer IN1 and the second blocking ink layer IN2 may be disposed on the background ink layer BIN. The background ink layer BIN is disposed on the bottom surface BF of the groove GV. The background ink layer BIN is provided directly on the bottom surface BF, and thus comes into contact with a portion of the side surface SF. The background ink layer BIN may be a layer that determines the color of the ink layer INL by including a material having a predetermined color. In an embodiment, for example, the background ink layer BIN may include a material having a black color, a blue color, a red color, a white color, or the like, but the embodiment of the invention is not limited thereto. The first blocking ink layer IN1 and the second blocking ink layer IN2 may each include a light blocking material, an epoxy-based resin, or the like. In an embodiment, for example, the first blocking ink layer IN1 and the second blocking ink layer IN2 may each include carbon black as a light blocking material, and may include a carbon dispersant for dispersing the carbon black.

In an embodiment, at least one selected from the first blocking ink layer IN1 and the second blocking ink layer IN2 may include a matting agent PA. In an embodiment, for example, the first blocking ink layer IN1 may include the matting agent PA, and the second blocking ink layer IN2 may not include the matting agent PA. In an alternative embodiment, the first blocking ink layer IN1 and the second blocking ink layer IN2 may each include the matting agent PA.

The content of the matting agent PA of the first blocking ink layer IN1 may be greater than the content of the matting agent PA of the second blocking ink layer IN2. In an embodiment, for example, where the first blocking ink layer IN1 includes the matting agent PA, and the second blocking ink layer IN2 may not include the matting agent PA, the content of the matting agent PA of the second blocking ink layer IN2 is 0 wt %, so that the content of the matting agent PA of the first blocking ink layer IN1 is greater.

Referring to FIG. 5B and FIG. 5C together, the first blocking ink layer IN1 may further include the matting agent PA. The matting agent PA may include $SiO_2$, and for example, the matting agent PA may include $SiO_2$ particles. In an embodiment, the average diameter of the $SiO_2$ particles may be about 6 micrometers ($\mu$m). FIG. 5B is an enlarged image of one $SiO_2$ particle included in the first blocking ink layer IN1. The second blocking ink layer IN2 may not include the matting agent PA.

The first blocking ink layer IN1 includes the matting agent PA, so that the surface roughness thereof may be different from the surface roughness of the second blocking ink layer IN2. In an embodiment, as the content of the matting agent PA in the first blocking ink layer IN1 increases, the surface roughness of the first blocking ink layer IN1 may increase, that is, the roughness of the first blocking ink layer IN1 may increase. Therefore, the first blocking ink layer IN1 includes the matting agent PA, and thus may have a higher (or greater) surface roughness than the second blocking ink layer IN2 that does not include the matting agent PA.

In an embodiment, the first blocking ink layer IN1 may have a surface roughness Ra in a range of about 0.6 $\mu$m to about 0.8 $\mu$m. The first blocking ink layer IN1 may have a surface energy of about 38 dynes per centimeter (dyne/cm) or greater. In the disclosure, surface energy may be measured by drawing a line with a dyne (test) pen on a surface to be measured.

In an embodiment, the first blocking ink layer IN1 may include the matting agent PA in an amount of greater than about 10 weight percent (wt %) based on the total content or weight of the first blocking ink layer IN1. In such an embodiment where the first blocking ink layer IN1 includes the matting agent PA in an amount of greater than about 10 wt %, the surface energy of the first blocking ink layer IN1 may be about 38 dyne/cm or greater.

In an embodiment, the first blocking ink layer may include the matting agent in an amount of about 12 wt % to about 14 wt %. In an embodiment, for example, the first blocking ink layer IN1 may include 13 about wt % of the matting agent PA. In such an embodiment where the first blocking ink layer IN1 includes about 13 wt % of the matting agent PA, the surface energy of the first blocking ink layer IN1 may be about 44 dyne/cm or greater.

The second blocking ink layer IN2 may include the matting agent PA in an amount of about 5 wt % or less based on the total content or weight of the second blocking ink layer IN2. In an embodiment, the second blocking ink layer IN2 may not include the matting agent PA. The second blocking ink layer IN2 may have a surface roughness Ra in a range of about 0 μm to about 0.06 μm. The second blocking ink layer IN2 may have a surface energy of about 30 dyne/cm or less.

In Table 1 below, the roughness and surface energy properties of ink layers of Example 1 and Comparative Example 1 to Comparative Example 3 are shown. The roughness was measured by surface roughness, and the surface energy was measured by drawing a line with a dyne pen on a surface to be measured. The ink layers of Example 1 and Comparative Example 1 to Comparative Example 3 are ink layers including a light blocking material, an epoxy-based resin, and the matting agent PA, respectively.

The ink layer of Example 1 was formed by an ink material including 13 wt % of the matting agent based on the total content. The ink layer of Comparative Example 1 was formed by an ink material including 10 wt % of the matting agent based on the total content. The ink layer of Comparative Example 2 was formed by an ink material including 3 wt % of the matting agent based on the total content. The ink layer of Comparative Example 3 was formed by an ink material including 0 wt % of the matting agent based on the total content.

FIG. 5D is images of surfaces of ink layers according to the content of a matting agent. Specifically, (a), (b), (c), and (d) of FIG. 5D are respectively an image of the surface of the ink layer of each of Comparative Example 3, Comparative Example 2, Comparative Example 1, and Example 1.

Referring to FIG. 5D and Table 1 below, the surface roughness of an ink layer according to a content of the matting agent PA will be described.

TABLE 1

| Classifications | Content of matting agent (wt %) | Roughness (Surface roughness, μm) | Surface energy (Dyne Pen Test, dyne/cm) |
|---|---|---|---|
| Example 1 | 13 | 0.675 | 44 |
| Comparative Example 1 | 10 | 0.565 | 33 |
| Comparative Example 2 | 3 | 0.326 | 30 |
| Comparative Example 3 | 0 | 0.057 | 30 |

Referring to Table 1 and (a) of FIG. 5D, the ink layer of Comparative Example 3 does not include a matting agent. Therefore, only an ink base RS was identified on the surface of the ink layer. The ink base RS may include an epoxy-based resin and a light blocking material. In (a) of FIG. 5D, foreign substances such as dust present on the ink base RS are represented as white particles.

Referring to (b) of FIG. 5D, the matting agent PA was identified on the surface of the ink layer of Comparative Example 2. It can be confirmed that the amount of the matting agent PA increases on the surface of the ink layer and the roughness of the surface of the ink layer increases in the order of (b), (c), and (d) of FIG. 5D.

Referring to Table 1 and FIG. 5D, it can be confirmed that as the content (wt %) of the matting agent of the ink layer increases, the roughness and surface energy of the surface of the ink layer increase.

The window according to an embodiment of the invention includes the first blocking ink layer IN1 and the second blocking ink layer IN2, where the first blocking ink layer IN1 includes a matting agent in an amount of greater than about 10 wt %, e.g., in a range of about 12 wt % to 14%, so that surface energy of about 38 dyne/cm or greater may be implemented, and a roughness higher than that of the second blocking ink layer IN2 may be implemented. The second blocking ink layer IN2 may include a matting agent in an amount of about 5 wt % or less, e.g., may not include the matting agent, so that surface energy of about 30 dyne/cm or less may be implemented, and a roughness relatively lower than that of the first blocking ink layer IN1 may be implemented.

The first blocking ink layer IN1 is disposed in a same layer as a layer in which the second blocking ink layer IN2 is disposed. The first blocking ink layer IN1 and the second blocking ink layer IN2 are each disposed on the background ink layer BIN, and in the groove GV. On a plane or when viewed in a plan view, a portion of the background ink layer BIN may overlap the first blocking ink layer IN1, and the remaining portion of the background ink layer BIN may overlap the second blocking ink layer IN2. That is, the entire portion of one surface of the background ink layer BIN is covered by the first blocking ink layer IN1 and the second blocking ink layer IN2.

The upper surface TF of the window base BS, an upper surface of the first blocking ink layer IN1, and an upper surface of the second blocking ink layer IN2 may be on a same plane. Accordingly, one surface of the window WD including the upper surface TF of the window base BS may have a flat surface, and the flat surface may be provided to a component disposed on the window WD.

In FIG. 5A, FIG. 6, and FIG. 8A to FIG. 8J, the window WD is disposed on a surface facing the third direction DR3 with respect to the display module DM in the same manner as in FIG. 1 and FIG. 2, but is illustrated in reverse of what is illustrated in FIG. 1 and FIG. 2 for purpose of description.

Figure 6:
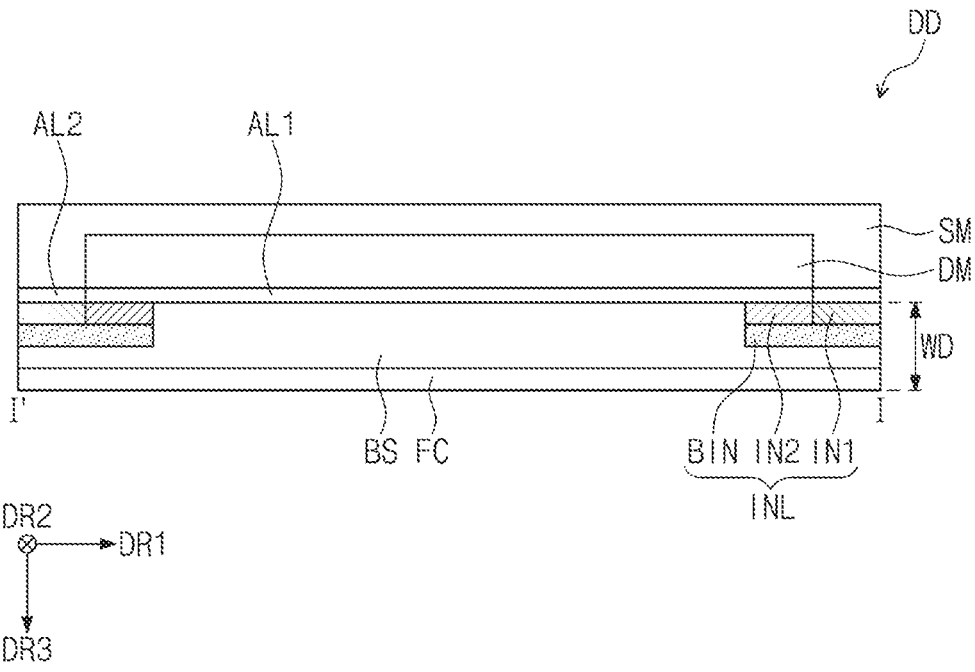
FIG. 6 is a cross-sectional view of an alternative embodiment showing a portion taken along line I-I' of FIG. 1.

FIG. 6 is a cross-sectional view of an alternative embodiment showing a portion taken along line I-I' of FIG. 1.

Referring to FIG. 6, the display module DM is disposed on the window WD. In an embodiment, the display module DM is disposed on the upper surface TF of the window base BS and on the second blocking ink layer IN2. In an embodiment, for example, the active region AA of the display module DM is disposed on the upper surface TF of the window base BS, and overlaps (or corresponds to) the upper surface TF of the window base BS on a plane. In addition, the peripheral region NAA of the display module DM is disposed on the second blocking ink layer IN2, and overlaps (or corresponds to) the second blocking ink layer IN2 on a plane. In an embodiment, as shown in FIG. 6, the display module DM may further include a first adhesive layer AL1 in addition to the components described above with reference to FIG. 4. The display module DM may be attached to the window WD by the first adhesive layer AL1. The first adhesive layer AL1 overlaps the active region AA, and thus may include a transparent material. In an embodiment, for example, the first adhesive layer AL1 may be a transparent adhesive layer such as an optically clear adhesive (OCA) film or an optically clear resin (OCR).

The set module SM is disposed on the window WD and on the display module DM. In an embodiment, the set module SM covers the display module DM and is disposed on the first blocking ink layer IN1 of the window WD. The set module SM may further include a second adhesive layer AL2 in addition to the components described above with reference to FIG. 2. The set module SM may be attached to the window WD by the second adhesive layer AL2. The second adhesive layer AL2 does not overlap the active region AA, and thus may not include a transparent material as opposed to the first adhesive layer AL1. However the embodiment of the invention is not limited embodiment thereto, and the second adhesive layer AL2 may include a transparent material. In an alternative embodiment, for example, the second adhesive layer AL2 may be a pressure sensitive adhesive (PSA) film, an optically clear adhesive (OCA) film, or an optically clear resin (OCR).

The set module SM is disposed on the window WD while covering the display module DM, the first blocking ink layer IN1 may surround the second blocking ink layer IN2 on a plane. The second blocking ink layer IN2 may be disposed in contact with the side surface SF on the background ink layer BIN, and the first blocking ink layer IN1 may be disposed in contact with the second blocking ink layer IN2 on the background ink layer BIN.

In an embodiment, as described above, the surface roughness of the first blocking ink layer IN1 may be different from the surface roughness of the second blocking ink layer IN2. In an embodiment, the surface roughness of the first blocking ink layer IN1 to which the set module SM is attached may be higher than the surface roughness of the second blocking ink layer IN2 to which the display module DM is attached. Since the first blocking ink layer IN1 has a surface roughness higher than that of the second blocking ink layer IN2, adhesive strength between the set module SM and the first blocking ink layer IN1 may be improved. Since the second blocking ink layer IN2 has a surface roughness relatively lower than that of the first blocking ink layer IN1, bubbles may be effectively prevented from being generated during a process in which the display module DM is attached to the second blocking ink layer IN2. In addition, since there is no step present on the second blocking ink layer IN2 to which the display module DM is attached and on the upper surface TF of the window base BS, adhesive strength between the display module DM and the window WM may be further improved, and the generation of bubbles may be prevented.

In an embodiment of the invention, the window WD may further include a window functional layer FC disposed in a lower portion of the window base BS. The window functional layer FC may include at least one selected from a fingerprint prevention layer and a hard coating layer. The window functional layer FC may prevent the window WD from external impacts by including the hard coating layer. The window functional layer FC may provide a user with convenience of using the window WD by including the fingerprint prevention layer. Examples of the window functional layer FC is not limited thereto.

The window WD of the invention includes the groove GV formed in the window base BS, and the ink layer INL is disposed in the groove GV, so that one surface of the window WD including the upper surface TF of the window base BS may have a flat surface. In addition, by adjusting the surface roughness of the second blocking ink layer IN2 to which the display module DM is attached and the surface roughness of the first blocking ink layer IN1 to which the set module SM is attached to be different from each other, it is possible to improve adhesive strength between the window WD and the set module SM while preventing a defect in which bubbles are generated between the window WD and the display module DM. Accordingly, display quality and reliability of the display device DD including the window WD of the invention may be improved.

Figure 7:
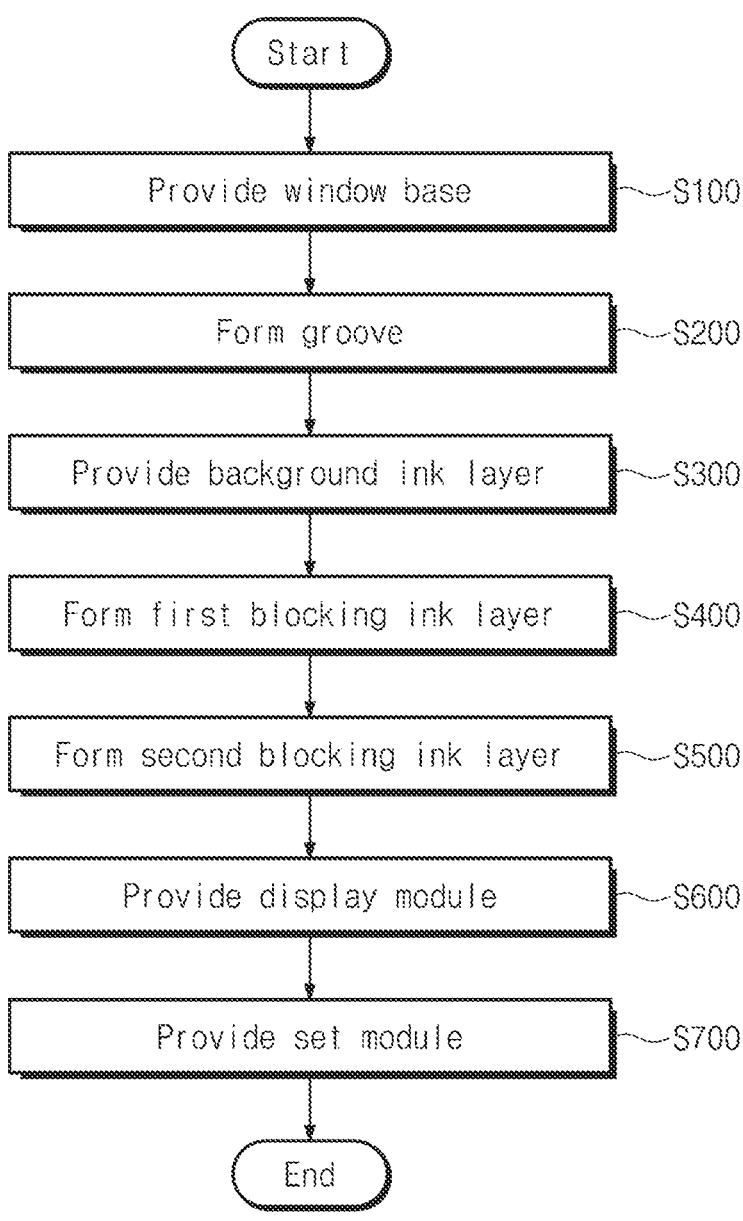
FIG. 7 is a flow chart showing a method for manufacturing a display device according to an embodiment of the invention.

FIG. 7 is a flowchart showing a method for manufacturing a display device of an embodiment of the invention. FIG. 8A to FIG. 8J schematically illustrates processes of the method for manufacturing a display device of an embodiment of the invention. Hereinafter, the same reference numerals are given to the same elements as those described with reference to FIG. 1 to FIG. 6, and any repetitive detailed descriptions thereof are omitted.

The method for manufacturing a display device of an embodiment may include providing a window base (S100), forming a groove (S200), providing a background ink layer (S300), forming a first blocking ink layer (S400), forming a second blocking ink layer (S500), providing a display module (S600), and providing a set module (S700).

Figure 8A:
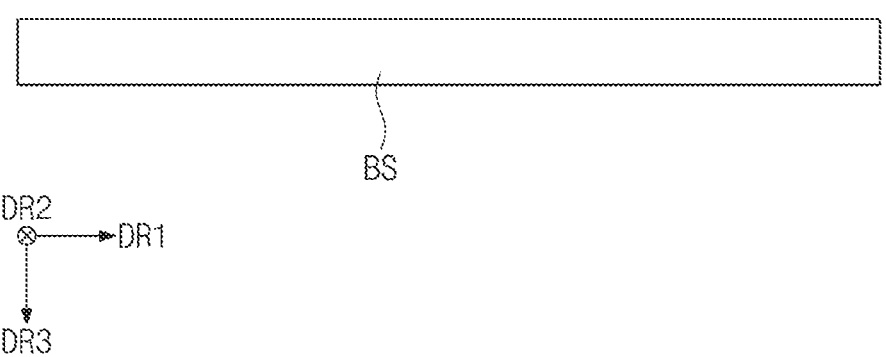
FIG. 8A to FIG. 8J schematically illustrate processes of a method for manufacturing a display device of an embodiment of the invention.
Figure 8B:
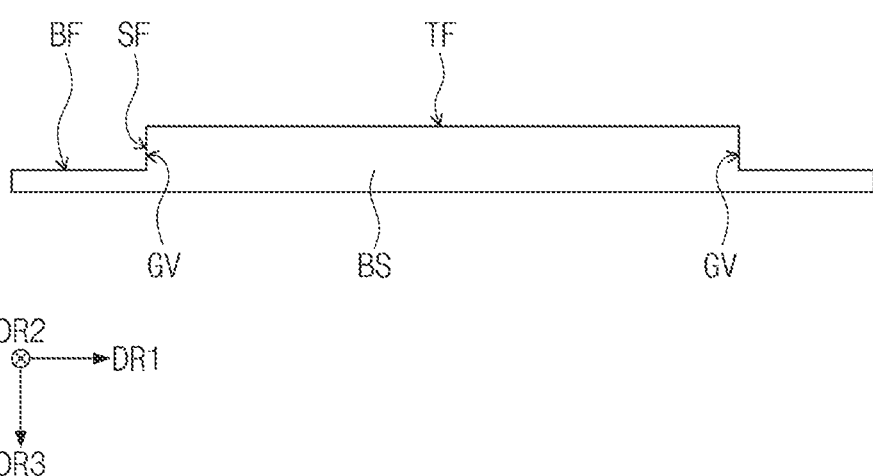
Figure 8C:
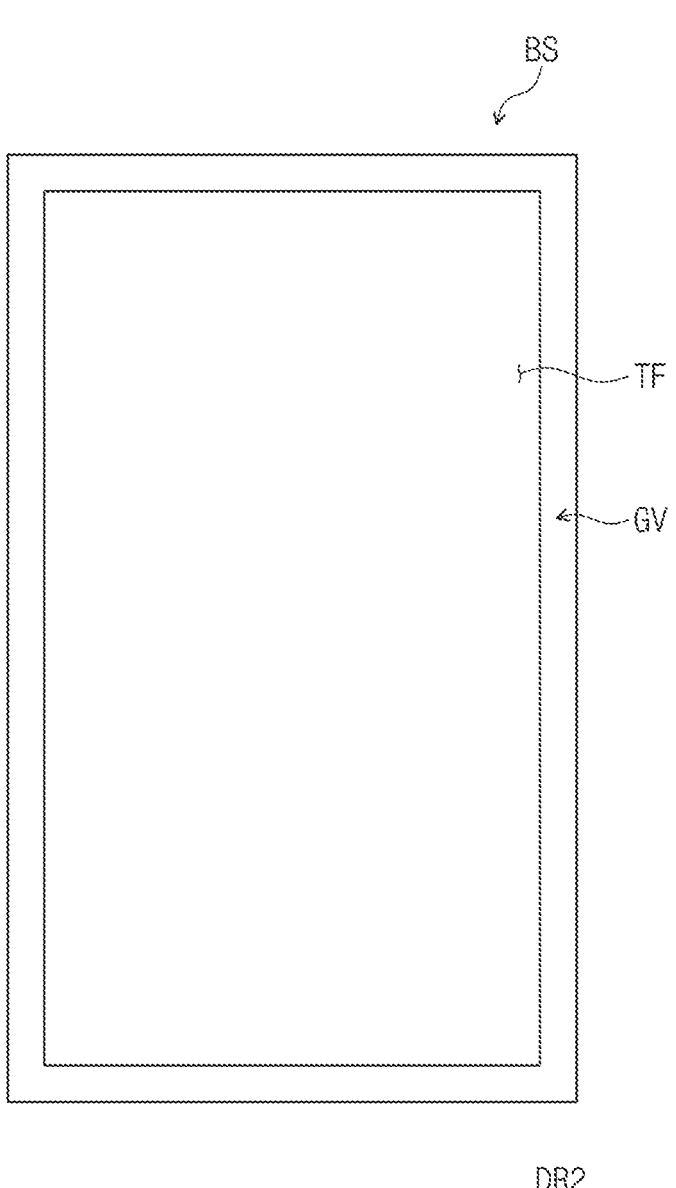
Figure 8C:
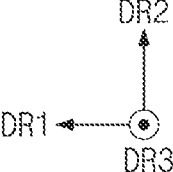

Referring to FIG. 8A, FIG. 8B, and FIG. 8C together, the providing of a window base S100 and the forming of a groove S200 may be a step of forming a groove GV by processing a window base BS. The window base BS may include at least one selected from a glass substrate, a sapphire substrate, and a plastic substrate. In an embodiment, for example, the window base BS may be a glass substrate. However, the embodiment of the invention is not limited thereto.

The groove GV may be formed by removing a portion of an upper surface TF of the window base BS by at least one method of laser, computer numerical control (CNC), or chemical etching. The groove GV may have a recessed shape along a third direction DR3 from the upper surface TF of the window base BS. The height of the groove GV in the third direction DR3 may be less than the thickness of the window base BS.

In an embodiment, the groove GV may be formed along an edge of the window base BS. However, the embodiment of the invention is not limited thereto.

The groove GV may include a bottom surface BF and a side surface SF extending and bent from the bottom surface BF. The side surface SF may connect the bottom surface BF to the upper surface TF of the window base BS. Since the groove GV has a recessed shape on the upper surface TF of the window base BS, the flow and overflow of an ink material provided to the groove GV in a subsequent process may be controlled.

Figure 8D:
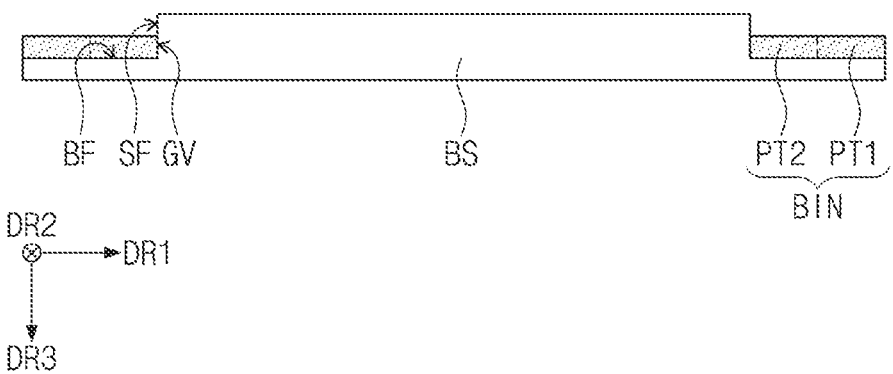
Figure 8E:
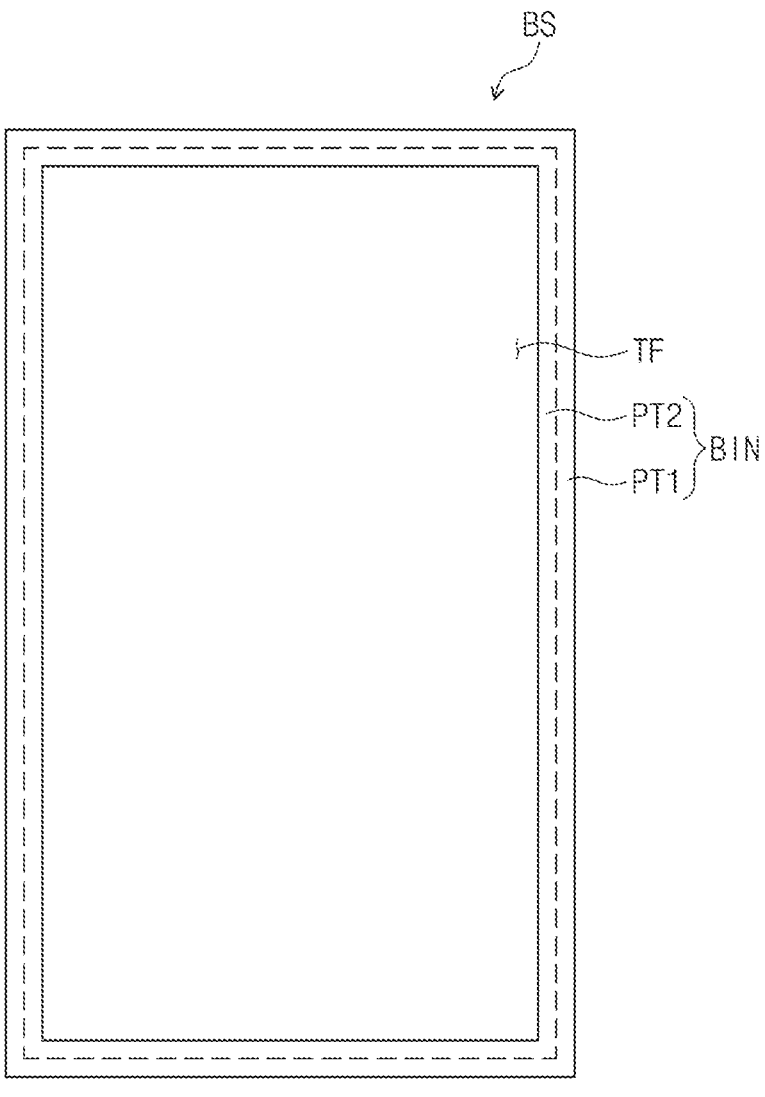
Figure 8E:
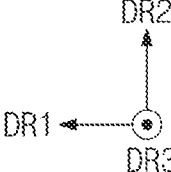

Referring to FIG. 8D and FIG. 8E, the providing a background ink layer S300 may include providing a background ink layer BIN to the groove GV.

A background ink material is provided to fill the bottom surface BF of the groove GV, and the background ink material may be dried for a predetermined period of time to form the background ink layer BIN. The background ink material may include a material having a predetermined color. In an embodiment, for example, the background ink material may be black, and in an embodiment, the background ink material may be provided using a mask.

The background ink layer BIN may come into contact with a portion of the side surface SF. A portion of the side surface SF may be in contact with the background ink layer BIN, and a remaining portion EP thereof may be exposed from the background ink layer BIN.

Figure 8F:
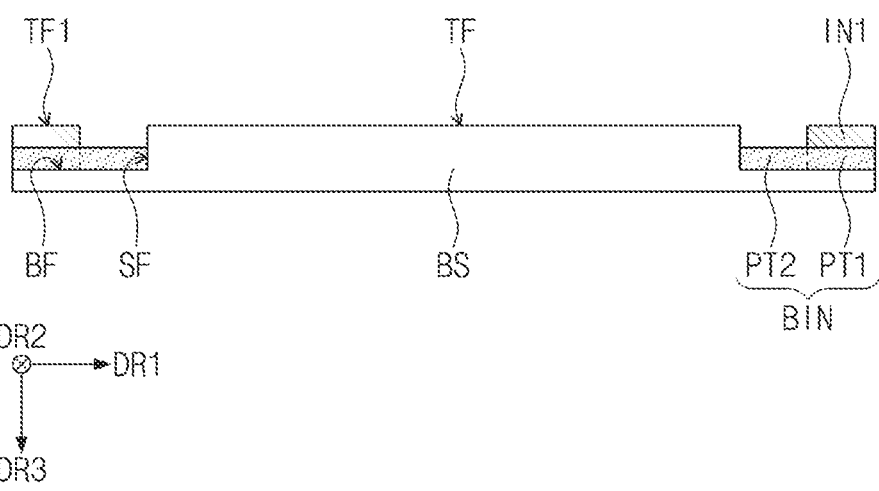

Referring to FIG. 8F together, the forming of a first blocking ink layer S400 is a step of providing a first blocking ink material on a first portion PT1 of the background ink layer BIN to form a first blocking ink layer IN1.

The background ink layer BIN may include the first portion PT1 and a second portion PT2 extending from the portion PT1. The first portion PT1 may correspond to a portion of the background ink layer BIN, and the second portion PT2 may be the remaining portion of the background ink layer BIN excluding the first portion PT1. In an embodiment, on a plane, the second portion PT2 may surround the upper surface TF of the window base BS, and the first portion PT1 may surround the second portion PT2. In an embodiment, as shown in FIG. 8E, the width of the first portion PT1 and the width of the second portion PT2 may be the same as each other, but the embodiment of the invention is not limited thereto, and the ratio of the width of the first portion PT1 to the width of the second portion PT2 may be variously changed.

In an embodiment, as shown in FIG. 8F, the first blocking ink layer IN1 may be formed by providing a first blocking ink material on the first portion PT1 of the background ink layer BIN. The first blocking ink material may be provided using a mask, and the first blocking ink material may be dried for a predetermined period of time to form the first blocking ink layer IN1.

The first blocking ink material may include an epoxy-based resin, a light blocking material, and a matting agent. In an embodiment, the first blocking ink material may include the matting agent in an amount of greater than about 10 wt % based on the total content of the first blocking ink material. Since the first blocking ink material includes the matting agent in an amount of greater than about 10 wt %, the first blocking ink layer IN1 formed by curing the first blocking ink material may exhibit a surface energy of about 38 dyne/cm or greater.

In an embodiment, the first blocking ink material may include the matting agent in an amount of about 12 wt % to about 14 wt %. In an embodiment, for example, the first blocking ink material may include the matting agent in an amount of about 13 wt %. In such an embodiment where the first blocking ink material includes the matting agent in an amount of about 13 wt %, the first blocking ink layer IN1 formed by curing the first blocking ink material may exhibit a surface energy of about 44 dyne/cm or greater.

The above-described features of the light blocking material and the matting agent may be equally applied to the light blocking material and the matting agent included in the first blocking ink material. In an embodiment, for example, the features of the matting agent PA described above with reference to FIG. 5B may be equally applied to the matting agent.

A first upper surface TF1 of the first blocking ink layer IN1 may be on a same plane as the upper surface TF of the window base BS.

Figure 8G:
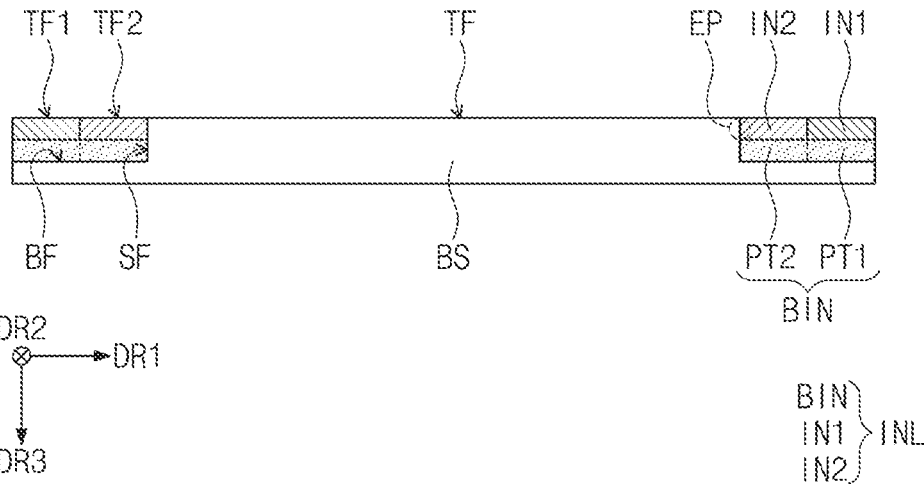

Referring to FIG. 8G, the forming the second blocking ink layer (S500) includes a process of providing a second blocking ink material on the second portion PT2 of the background ink layer BIN to form a second blocking ink layer IN2. The second blocking ink layer IN2 may come into contact with the portion (see FIG. 8F) of the side surface SF.

The second blocking ink material may be provided using a mask, and the second blocking ink material may be dried for a predetermined period of time to form the second blocking ink layer IN2. The second blocking ink material may include an epoxy-based resin and a light blocking material. the second blocking ink material may include the matting agent in an amount of 5 wt % or less. Preferably, the second blocking ink material may not include the matting agent. Accordingly, the second blocking ink layer IN2 formed by curing the second blocking ink material may exhibit a surface energy of about 30 dyne/cm or less. Accordingly, the surface roughness of the first blocking ink layer IN1 may be higher than the surface roughness of the second blocking ink layer IN2.

However, embodiments of the first blocking ink layer IN1 and the second blocking ink layer IN2 are not limited thereto. In an alternative embodiment, the first blocking ink material has a same composition as the second blocking ink material, and the drying time of the first blocking ink material may be set longer than the drying time of the second blocking ink material to increase the surface roughness of the first blocking ink layer IN1 compared to the surface roughness of the second blocking ink layer IN2. Alternatively, the drying temperature of the first blocking ink material may be set higher than the drying temperature of the second blocking ink material to increase the surface roughness of the first blocking ink layer IN1 compared to the surface roughness of the second blocking ink layer IN2. In drying the first and second blocking ink materials, as the drying temperature becomes higher or the drying time becomes longer, the matting agents included in the first and second blocking ink materials may rise to the surface, so that surface roughness may increase. However, the embodiment of the invention is not limited thereto, and in an alternative embodiment, the first blocking ink material has a different composition from the second blocking ink material, so that the surface roughness of the first blocking ink layer IN1 may be higher than the surface roughness of the second blocking ink layer IN2.

A second upper surface TF2 of the second blocking ink layer IN2 may be on a same plane as the upper surface TF of the window base BS and the first upper surface TF1 of the first blocking ink layer IN1.

Since the second blocking ink layer IN2 is provided, an ink layer INL may be provided to the groove GV of the window base BS.

Figure 8H:
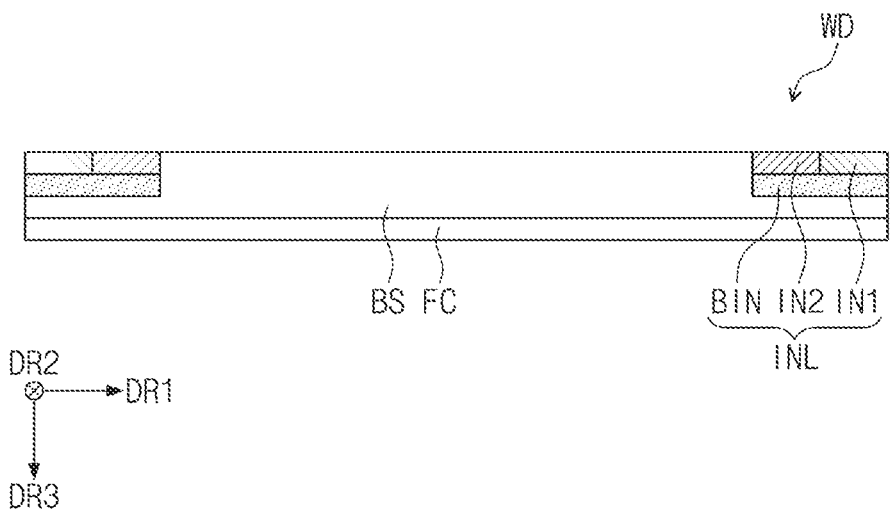

Referring to FIG. 8H, the method for manufacturing a display device may further include forming a window functional layer FC. In an embodiment, the window functional layer FC is disposed in a lower portion of the window base BS, and a window WD may be thereby formed.

Figure 8I:
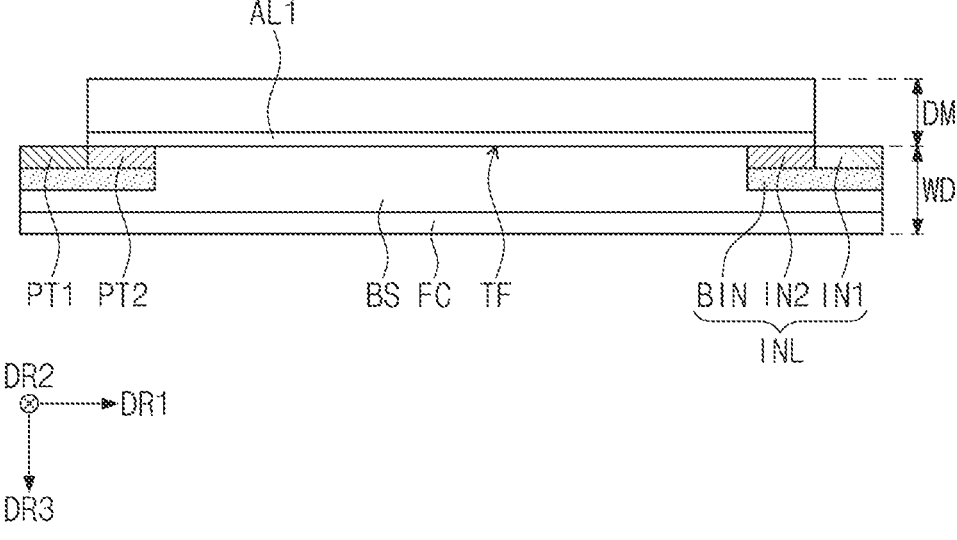

Referring to FIG. 8I, the providing the display module (S600) may include providing a display module DM on the window WD. In an embodiment, the display module DM may be provided on the upper surface TF of the window base BS and on the second blocking ink layer IN2. In an embodiment, the display module DM may be attached to the upper surface TF and to the second blocking ink layer IN2 by a first adhesive layer AL1. Since the second blocking ink layer IN2 has a roughness lower than that of the first blocking ink layer IN1, bubbles may be effectively prevented from being generated during a process in which the display module DM is attached to the second blocking ink layer IN2. In addition, since there is no step present between the upper surface TF of the window base BS and the second blocking ink layer IN2, adhesive strength between the display module DM and the window WD is further improved, and the generation of bubbles may be effectively prevented.

Figure 8J:
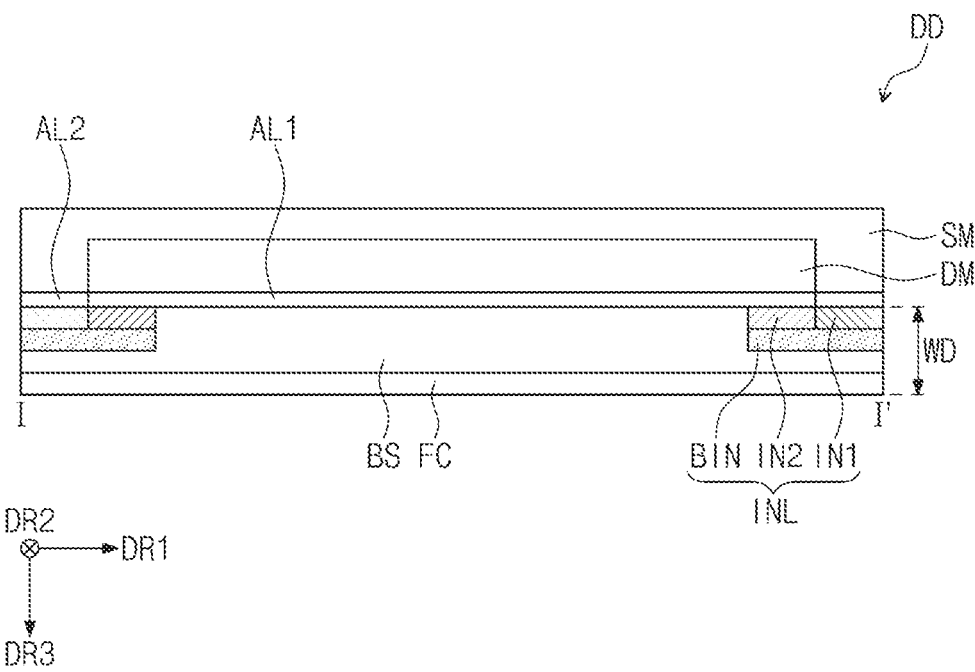

Referring to FIG. 8J, the providing a set module (S700) may be providing a set module SM on the window WD and on the display module DM. In an embodiment, the set module SM may be provided on the first blocking ink layer IN1 while housing the display module DM. In an embodiment, the set module SM may be attached to the first blocking ink layer IN1 by a second adhesive layer AL2. Since the first blocking ink layer IN1 has a roughness higher than that of the second blocking ink layer IN2, adhesive strength between the set module SM and the first blocking ink layer IN1 may be further improved. In such an embodiment, the set module SM is provided on the window WD and on the display module DM, and a display device DD may be thereby formed.

In an embodiment of a window, a groove is defined or formed in a window base, and an ink layer is disposed in the groove, so that an upper surface of the ink layer and an upper surface of the window base may be on a same plane. Accordingly, the window may provide a flat surface to a display module and a set module which are coupled to the window.

A display device according to an embodiment includes the window which provides a flat surface, so that adhesive strength between the window and the display module, and adhesive strength between the window and the set module may be improved. In such an embodiment, the window includes a first blocking ink layer having a relatively high surface roughness, and thus may improve adhesive strength between the window and the set module, and the window includes a second blocking ink layer having a relatively low surface roughness, and thus may effectively prevent bubbles from being generated when coupling the window to the display module. Accordingly, a bubble defect and a coupling defect in the display device may be effectively prevented such that reliability and display quality of the display device may be improved.

A window according to an embodiment may include an ink layer and provide a flat surface.

A display device according to an embodiment may have improved display quality and reliability.

A display device according to an embodiment may have an improved manufacturing yield.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A window comprising:
a window base with a groove having a recessed shape on an upper surface thereof; and
a first blocking ink layer and a second blocking ink layer each disposed in the groove,
wherein the first blocking ink layer and the second blocking ink layer are disposed directly on a same layer as each other,
the first blocking ink layer surrounds the second blocking ink layer in a plan view, and
a surface roughness of the first blocking ink layer is higher than a surface roughness of the second blocking ink layer.

2. The window of claim 1, wherein
at least one selected from the first blocking ink layer and the second blocking ink layer comprises a matting agent, and a content of the matting agent of the first blocking ink layer is greater than a content of the matting agent of the second blocking ink layer.

3. The window of claim 2, wherein the first blocking ink layer comprises the matting agent in an amount of greater than about 10 wt %.

4. The window of claim 2, wherein the first blocking ink layer comprises the matting agent in an amount of about 12 wt % to about 14 wt %.

5. The window of claim 2, wherein the second blocking ink layer does not comprise the matting agent.

6. The window of claim 1, further comprising:
a background ink layer disposed in the groove, wherein the first blocking ink layer and the second blocking ink layer are disposed on the background ink layer.

7. The window of claim 6, wherein in the plan view, a portion of the background ink layer overlaps the first background ink layer, and a remaining portion of the background ink layer overlaps the second blocking ink layer.

8. The window of claim 1, wherein the upper surface of the window base, an upper surface of the first blocking ink layer, and an upper surface of the second blocking ink layer are on a same plane.

9. The window of claim 1, wherein the groove is defined along an edge of the window base.

10. The window of claim 9, further comprising:
a background ink layer disposed in the groove,
wherein the groove includes a bottom surface and a side surface connected between the bottom surface and the upper surface,
the bottom surface is in contact with the background ink layer, and
the side surface is in contact with the background ink layer and with the second blocking ink layer.

11. The window of claim 1, wherein:
each of the first blocking ink layer and the second blocking ink layer comprises a light blocking material; and
the first blocking ink layer further comprises a matting agent including $SiO_2$.

12. The window of claim 1, wherein
the second blocking ink layer comprises a matting agent, and
the second blocking ink layer includes the matting agent in an amount of about 5 wt % or less.

13. The window of claim 12, wherein the matting agent includes $SiO_2$.

14. The window of claim 1, wherein the window base has light transmittance.

15. The window of claim 1, wherein a surface energy of the first blocking ink layer is about 38 dyne/cm or greater.

16. The window of claim 1, wherein a surface energy of the second blocking ink layer is about 30 dyne/cm or less.

17. A display device comprising a window, a display module disposed on an upper surface of the window, and a set module disposed on the display module,
wherein the window includes:
a window base with a groove having a recessed shape on the upper surface;
a first blocking ink layer disposed in the groove; and
a second blocking ink layer disposed in the groove and disposed directly on a same layer as the layer on which the first blocking ink layer is disposed directly,
the display module is disposed on an upper surface of the window base and on the second blocking ink layer in a plan view, the set module is disposed on the first blocking ink layer in the plan view, and a surface roughness of the first blocking ink layer is higher than a surface roughness of the second blocking ink layer.

18. The display device of claim 17, further comprising:

a background ink layer disposed in the groove, wherein the first blocking ink layer and the second blocking ink layer are disposed on the background ink layer.

19. The display device of claim 17, wherein the upper surface of the window base, an upper surface of the first blocking ink layer, and an upper surface of the second blocking ink layer are on a same plane.

20. The display device of claim 17, wherein the window comprises a transmissive region in which light is transmitted and a bezel region in which the light is blocked, and the groove is disposed in the bezel region.

21. The display device of claim 20, wherein in the plan view, the second blocking ink layer surrounds the transmissive region, and the first blocking ink layer surrounds the second blocking ink layer.

22. The display device of claim 20, wherein the display module comprises an active region and a peripheral region adjacent to the active region, and the active region is disposed on the transmissive region, and the peripheral region is disposed on the second blocking ink layer.

23. The display device of claim 22, wherein the set module covers the display module and is disposed on the first blocking ink layer.

24. The display device of claim 17, wherein:

the first blocking ink layer comprises a matting agent including $SiO_2$, and the second blocking ink layer does not comprise the matting agent.

25. A method for manufacturing a display device, the method comprising:

providing a window base including an upper surface and having light transmittance;

forming a groove having a recessed shape on the upper surface of the window base;

forming a first blocking ink layer on a portion of the groove; and forming a second blocking ink layer on a remaining portion of the groove, wherein the first blocking ink layer and the second blocking ink layer are disposed directly on a same layer as each other, and a surface roughness of the first blocking ink layer is higher than a surface roughness of the second blocking ink layer.

26. The method of claim 25, further comprising:

providing a background ink layer in the groove, wherein the first blocking ink layer is formed on a portion of the background ink layer, and the second blocking ink layer is formed on a remaining portion of the background ink layer.

27. The method of claim 25, further comprising:

providing a display module on the window base, wherein the display module is attached to the upper surface of the window base and to the second blocking ink layer.

28. The method of claim 27, further comprising:

providing a set module on the display module, wherein the set module is attached to the display module and to the first blocking ink layer.

29. The method of claim 25, wherein:

the forming the first blocking ink layer comprises providing a first blocking ink material on the portion of the groove and drying the first blocking ink material, the forming the second blocking ink layer comprises providing a second blocking ink material on the remaining portion of the groove and drying the second blocking ink material, and a drying time of the first blocking ink material is longer than a drying time of the second blocking ink material.

30. The method of claim 29, wherein the first blocking ink material comprises a matting agent including $SiO_2$.

31. The method of claim 30, wherein the first blocking ink material comprises the matting agent in an amount of greater than about 10 wt %.

32. The method of claim 30, wherein the first blocking ink material comprises the matting agent in an amount of about 12 wt % to about 14 wt %.

33. The method of claim 29, wherein the second blocking ink material comprises a matting agent including $SiO_2$, and the second blocking ink material includes the matting agent in an amount of about 5 wt % or less.

34. The method of claim 25, wherein the upper surface of the window base, the first blocking ink layer, and the second blocking ink layer are on a same plane.

* * * * *